US005179491A

United States Patent [19]

Runyan

[11] Patent Number: 5,179,491

[45] Date of Patent: Jan. 12, 1993

[54] PLUG-IN CIRCUIT BREAKER

[75] Inventor: Daniel J. Runyan, Hickman, Nebr.

[73] Assignee: Square D Company, Palatine, Ill.

[21] Appl. No.: 555,336

[22] Filed: Jul. 19, 1990

[51] Int. Cl.[5] ........ H02H 3/16

[52] U.S. Cl. ........ 361/45; 361/46; 361/376; 361/361; 335/18

[58] Field of Search ........ 361/45, 46, 49, 355, 361/361, 376; 335/18

[56] References Cited

U.S. PATENT DOCUMENTS

| | | | |
|---|---|---|---|
| 3,246,098 | 4/1966 | Hall | 335/35 |
| 4,521,824 | 6/1985 | Morris et al. | 361/45 |
| 4,660,009 | 4/1987 | Wafer et al. | 335/6 |
| 4,926,282 | 5/1990 | McGhie | 361/102 |

*Primary Examiner*—A. D. Pellinen

*Attorney, Agent, or Firm*—Kareem M. Irfan; Nicholas J. Camasto

[57] ABSTRACT

A plug-in ground fault interrupting type circuit breaker includes a resilient jaw for engaging the neutral bar in a loadcenter. The jaw is formed at the end of a conductive strap which passes through the window of a transformer and terminates in a screw terminal for attachment to a neutral load conductor. The phase conductive path also includes a conductive strap that is coupled at one end to a phase load conductor terminal and at its other end to the breaker trip mechanism. The transformer and both strap conductors are mounted to a printed circuit board that is included within the breaker housing. The invention eliminates the separate pigtail for connecting the load neutral conductor to the loadcenter neutral bar.

3 Claims, 3 Drawing Sheets

FIG. 4
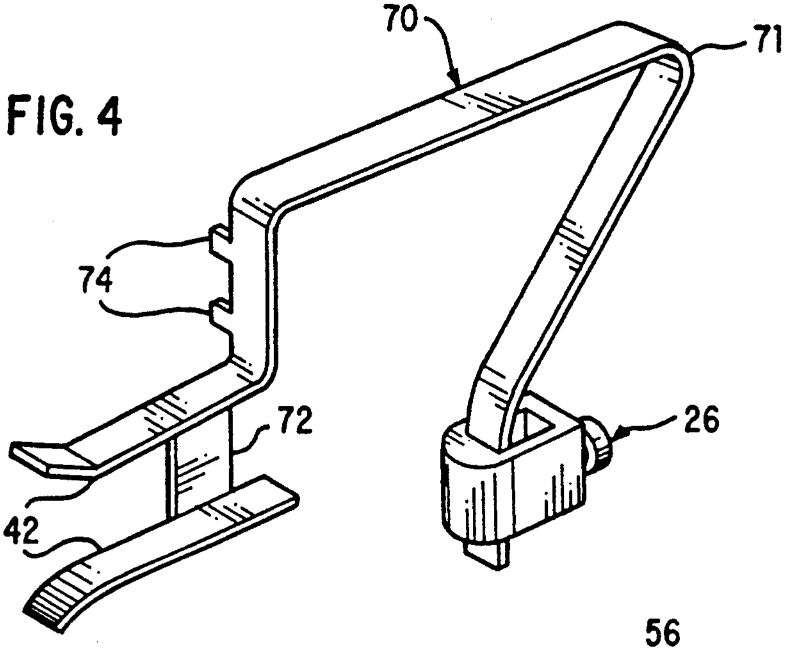
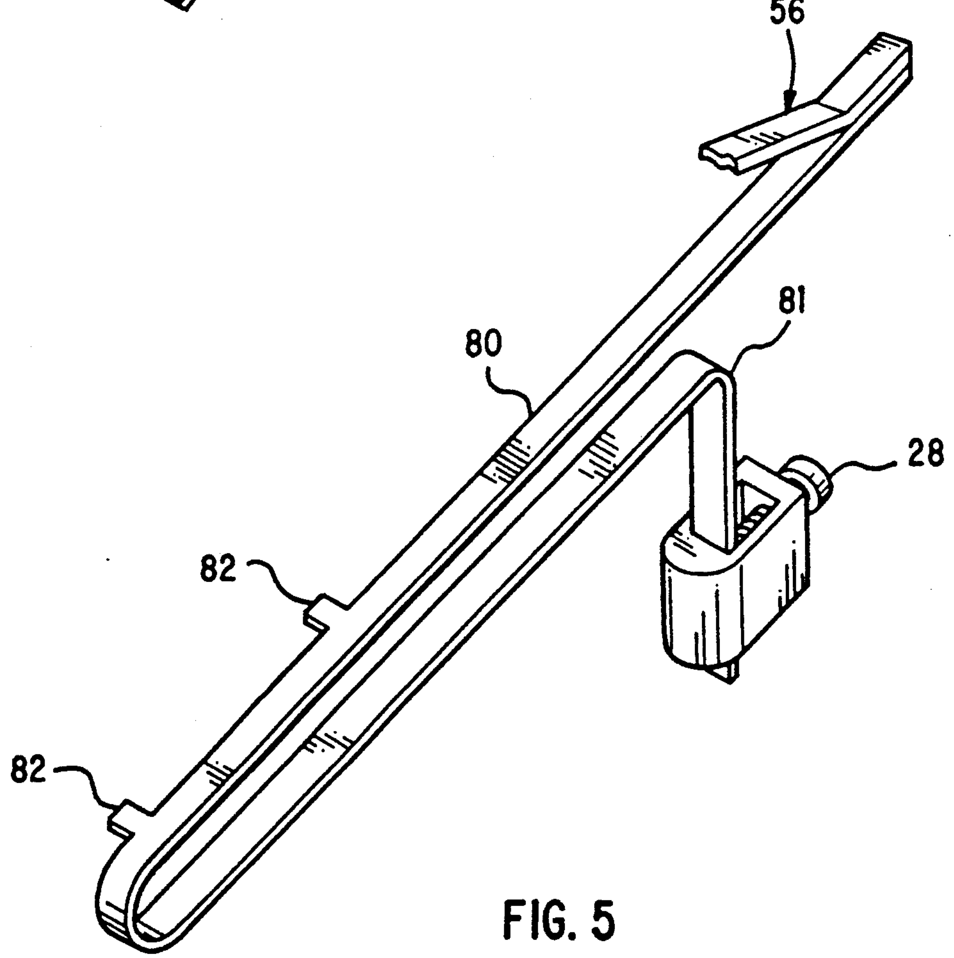
FIG. 5

PLUG-IN CIRCUIT BREAKER

CROSS REFERENCE TO RELATED PATENT APPLICATION

This invention is related to co-pending U.S. patent application Ser. No. 382,830, filed Jul. 19, 1989 in the name of Sharp et al and entitled IMPROVED RESIDENTIAL LOADCENTER, which application is assigned to Square D Company and is incorporated herein by reference.

BACKGROUND OF THE INVENTION AND PRIOR ART

This invention relates in general to circuit breakers and particularly to switched neutral circuit breakers and to circuit breakers that include a ground fault interrupting capability.

Ground fault interrupter (GFI) type circuit breakers and switched neutral (SWN) circuit breakers have been developed in response to a growing need for protection from potentially lethal leakage currents that may develop due to faulty electrical equipment or defective neutral connections. The operation of such circuit breaker is well known in the art. The GFI breakers generally includes a means for sensing an unbalance in the electrical phase and neutral currents flowing to a load circuit, which indicates that some of the current is flowing in paths external to the wired path. Such current is referred to as ground fault current. A particular type of ground fault interrupting circuit breaker manufactured by Square D Company includes a conductive resilient jaw (or stab) for electrically and mechanically engaging one electrical phase busbar and an insulating resilient clamp that clips onto the other electrical phase bus bar for locating and supporting the circuit breaker. Separate phase and neutral connector terminals are provided on the breaker for connection to the appropriate phase and neutral load conductors. The phase conductive path includes a breaker mechanism for interrupting current. A separate stranded wire (pigtail) is provided for connecting the circuit breaker neutral to the panel board or loadcenter neutral. The pigtail is connected to a wire that passes through the window of a ground fault transformer to the neutral connector. A wire in the phase conductive path also passes through the transformer window and couples to the interrupting mechanism of the breaker. The electronics (components and circuitry) for operating the ground fault interrupter are included on a printed circuit board that is mounted in the breaker housing and on which the transformer is secured. Other prior art GFI breakers use "dummy" housings to attach the GFI electronics.

Switched neutral type breakers are used in special environments and generally consist of two-pole housings with only one phase stab being electrically connected to the source. The second phase interrupting mechanism is connected in the neutral load circuit. The neutral is again connected to the panel neutral by means of a stranded wire pigtail.

The above-identified prior art circuit breakers work well, but require extra care and attention during installation and clutter the wireways in the loadcenter because of the need to accommodate the coiled pigtail. Use of more than one of such breakers compounds the cluttered wireway problem. Such breakers also require added manufacturing operations which add to their cost and complexity.

The present invention circuit breaker solves many of the shortcomings of the prior art as exemplified by the above-identified ground fault interrupting circuit breaker.

SUMMARY OF THE INVENTION

The ground fault interrupting circuit breaker of the invention includes a separate stab for electrically and mechanically engaging the neutral bar in the loadcenter and eliminates the neutral pigtail. The neutral stab is formed from a single piece of conductive strap that passes through the window of the GFI transformer and terminates in a neutral connector terminal. The phase conductive path includes a conductive strap that terminates in the phase connector terminal at one end, passes through the transformer and terminates to the bimetallic element of the current interrupting means at its other end. Both conductive straps are physically secured to the printed circuit board.

OBJECTS OF THE INVENTION

A principal object of the invention is to provide an improved circuit breaker.

Another object of the invention is to provide a GFI circuit breaker that is readily installed in a loadcenter.

A further object of the invention is to provide a plug-in GFI circuit breaker that is compatible with existing loadcenter installations.

BRIEF DESCRIPTION OF THE DRAWINGS

The above and other objects and advantages of the invention will be apparent upon reading the following description in conjunction with the drawings in which:

FIG. 4 is a perspective view of the conductive neutral strap used in the circuit breaker of the invention; and FIG. 5 is a perspective view the phase conductive strap used in the circuit breaker of the invention.

DESCRIPTION OF THE PREFERRED EMBODIMENT

Figure 1:
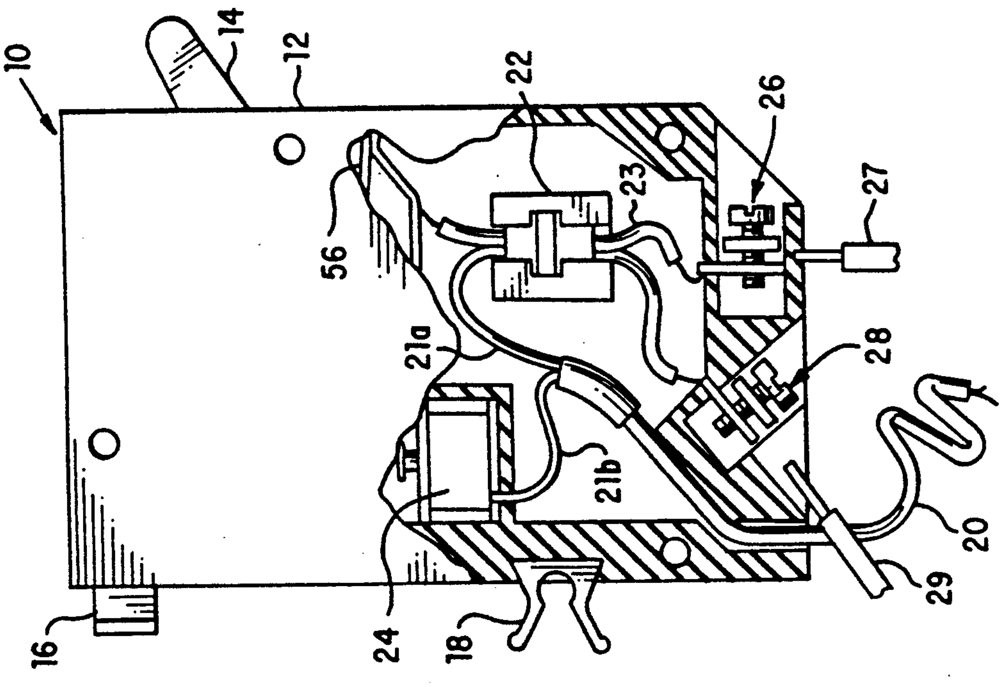
FIG. 1 (PRIOR ART)
FIG. 1 is a broken away view of a prior art GFI circuit breaker.

In FIG. 1, a GFI type circuit breaker, generally corresponding to Square D Company's trademarked QO GFI breaker, is shown. The circuit breaker 10 includes a housing 12 and an operating handle 14. A conductive, resilient line or phase stab 16 is used in conjunction with a nonconductive resilient clamp 18 for mounting the circuit breaker in an appropriate loadcenter. The breaker includes a coiled neutral lead or pigtail 20 that connects (within the housing 12) with a flexible lead 21*a* that passes through the window of a ground fault transformer 22 and is coupled to a trip coil 24 via lead 21*b*. The phase conductive path includes a breaker mechanism of the type described in U.S. Pat. No. 2,902,560 and incorporated herein by reference, but not shown, that connects to phase stab 16 and to a bimetallic element (often referred to as a magnetic yoke or loop), the end portion (56) of which is shown, and a stranded wire 23 that passes through the window of GFI transformer 22. A phase load connector terminal 26 and a neutral load connector terminal 28 are connected, generally by welding, to stranded wires 23 and 21*a*. Specifically phase wire 23 is welded to the magnetic loop end portion 56 and to terminal 26. The neutral wire 21*a* is welded to terminal 28 and soldered to pigtail 20 and trip coil lead 21*b*. A load phase conductor 27 and a load neutral conductor 29 are connectable to terminal 26 and 28, respectively. The end of pigtail 20 (which is generally much longer than illustrated) is connectable to the neutral bar of the loadcenter.

Figure 2:
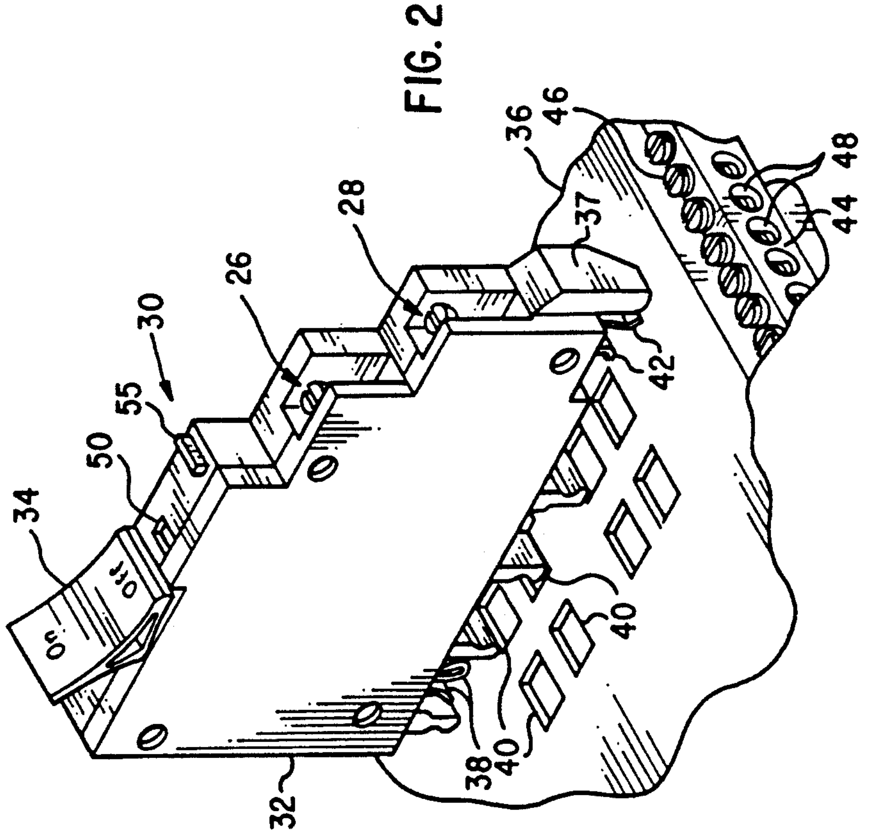
FIG. 2 is a perspective view showing installation of a circuit breaker constructed in accordance with the invention in a loadcenter panel.

FIG. 2, illustrates a circuit breaker 30 that is constructed in accordance with the invention. Breaker 30 includes a body or housing 32 with a resilient phase or line stab 38 that is engageable, via suitable apertures 40, with a phase busbar (not shown) in a panel board 36. The configuration of the panel board 36 and breaker housing 32 are as disclosed in the co-pending application mentioned above. Breaker 30 also includes a resilient neutral jaw 42 that is engageable with the neutral bar 44 in the loadcenter. Neutral bar 44, as illustrated, is rectangular and includes a plurality of threaded apertures and matching screws 46 and plain apertures 48. The stripped ends of neutral conductors to the various load circuits are placed in respective ones of apertures 48 and electrically and mechanically secured thereto by tightening the appropriate one of screws 46. The neutral jaw 42 is designed to mechanically and electrically engage the neutral bar 44. In operation the jaw straddles a corresponding one of the screws 46. Because of the cut away plastic portion 37, access to all but one of the apertures 48 is permitted when breaker 30 is mounted in position. Thus mounting of the circuit breaker of the invention to the panel board, does not affect the ability of the neutral bar 44 to accommodate conventional neutral wire connections or additional circuit breakers of the invention.

Figure 3:
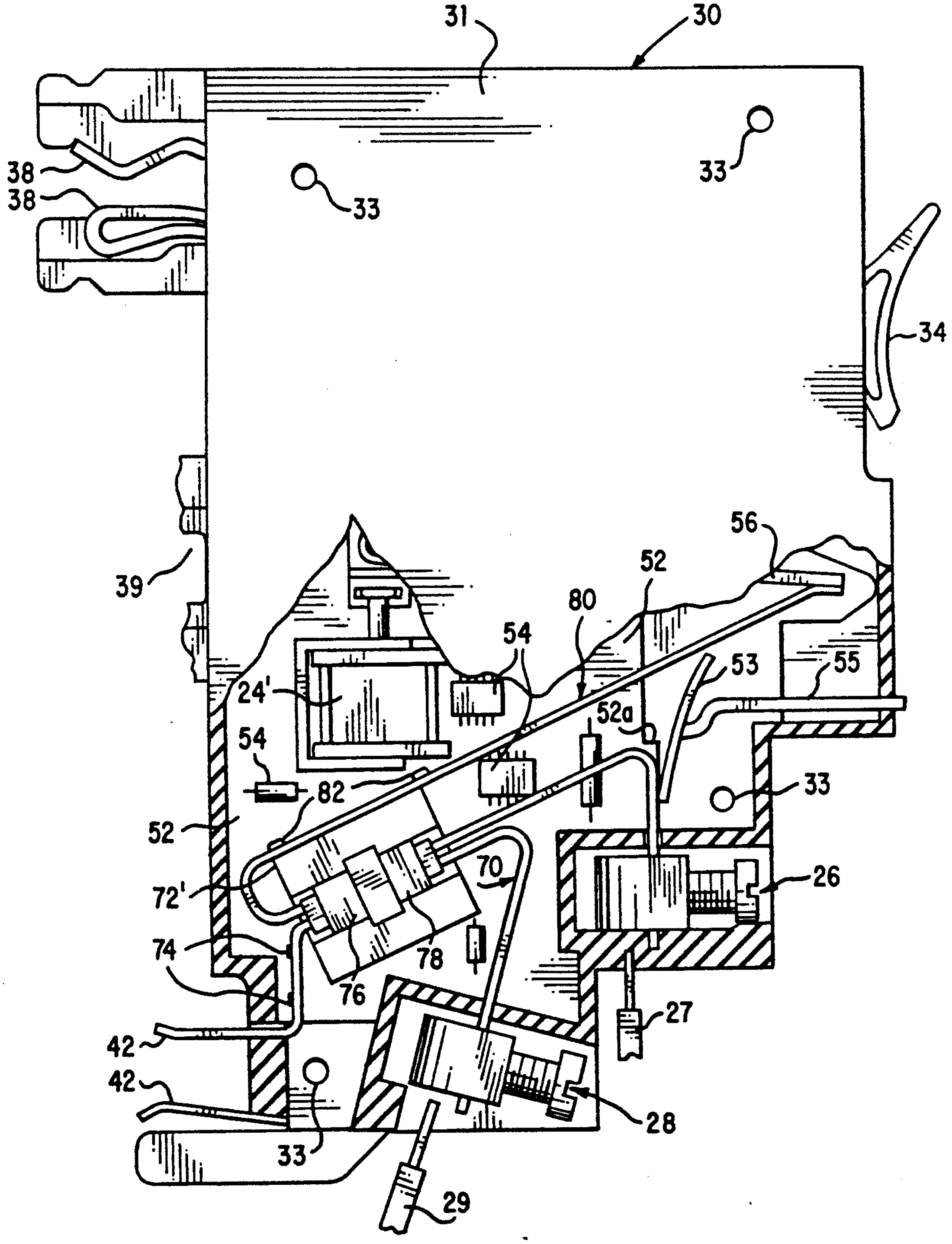
FIG. 3 is an enlarged broken away view showing the novel elements of the circuit breaker of the invention.

In FIG. 3 a partial cut away view of breaker 30 is illustrated. A plurality of apertures 33 may be used to secure a removable cover to the breaker housing. A rocker type handle mechanism 34 with a large curved area, for permitting ready and comfortable manipulation by the human thumb, is also shown. Since the operating and circuit interrupting mechanisms of the breaker are well known, and do not play a significant role in the present invention, they are not discussed further. Reference may be made to U.S. Pat. No. 2,902,560, aforesaid for such discussion. A printed circuit board 52 is generally illustrated and includes a number of electrical components 54 (such as resistors, capacitors and integrated circuits) mounted thereon. A modified trip coil 24' is illustrated. The modification consists in having both terminals of the trip coil 24' connected to circuit foil patterns (not shown) on the printed circuit board 52 rather than having a lead (21*b*, FIG. 1) that has to be separately soldered. As will be seen this construction and that of the strap type neutral and phase conductors, permits simplified manufacture with wave soldering techniques. The neutral and phase conductors 70 and 80, respectively are in the form of flat conductive straps that are bent to appropriate shape and connected to phase and neutral load connector terminals 27 and 29, respectively. The other end of neutral conductor 70 has neutral jaw 42 integrally formed thereat. Phase conductor 80 is welded to magnetic loop end portion 56. Both conductors 70 and 80 pass through a window in GFI transformer 22' as shown. Conductors 70 and 80 are physically supported on printed circuit board 52 by means of pairs of legs 74 and 82, respectively, that are soldered to board 52. A test circuit is formed by a flat metal spring element 53 that is movable by a test button 55 that extends outside of breaker 30 and electrically engages a conductive edge 52*a* on printed circuit board 52 and a portion of phase conductor 80. The spring element 53 is biased to a nonengaging position. The test feature simulates a ground fault to test the GFI.

As best shown in FIGS. 4 and 5, the conductors 70 and 80 are formed by cutting stock material to appropriate length and shape and bending. Thus a simple manufacturing technique is used to form the bight portion 72 of jaw 42 and leg portions 74. In practice the bends 71 and 81 of the strap conductors 70 and 80 may be formed after insertion of the conductors through the window of transformer 22' and before the wave soldering operation. The terminals 26 and 28 are of standard split bolt construction. Tightening of the screws therein serves to mechanically secure and to electrically connect the appropriate load wires to the strap conductors.

A comparison of the FIGS. 1 and 3 clearly illustrates the manufacturing advantages achieved with the arrangement of the invention. Specifically, the only separate connection that is required in FIG. 3 is the welding of phase connector 80 to magnetic loop end portion 56. On the contrary, the FIG. 1 construction involves the additional welding of wires 21*a* and 23 as well as a soldered junction or mechanical stake of three wires (21*a*, 21*b* and pigtail 20). Further, the breaker of FIG. 1 requires that a separate screw type neutral connection be made by the technician. Specifically, the pigtail 20 has to be connected to the neutral bar of the loadcenter. That is accomplished automatically in the novel circuit breaker of the invention by jaw 42 physically engaging the neutral bar. It is thus clear that significant savings in manufacturing cost and installation time are achieved with the breaker of the invention. Further, the danger that the electrician will fail to make the connection to the panel neutral is eliminated.

It is recognized that numerous changes in the described embodiment of the invention will be apparent to those skilled in the art without departing from its true spirit and scope. The invention is to be limited only as defined in the claims.

What is claimed is:

1. A plug-in circuit breaker for use with a loadcenter having an electrical phase busbar and an electrical neutral bar comprising:
   - a first push-on connector adapted to mechanically and electrically engage said electrical phase busbar;
   - interrupting means for interrupting current connected to said first push-on connector; p1 a second push-on connector adapted to mechanically and electrically engage said electrical neutral bar;
   - ground fault circuit means including a transformer mounted on a printed circuit board, said transformer including a window;
   - first and second flat, rigid conductive straps passing through said window and being mechanically secured to said printed circuit board;
   - said first conductive strap being coupled to said interrupting means at one end and to a phase load terminal at its other end; and
   - said second conductive strap being coupled to said second push-on connector at one end and to a neutral load terminal at its other end.

2. The circuit breaker of claim 1, wherein said second push-on connector is integrally formed with said second conductive strap and comprises a pair of resilient jaw members.

3. A plug-in circuit breaker, for use with a loadcenter having an electrical phase busbar and an electrical neutral busbar comprising:

a housing including means for interrupting current;

electronic ground fault sensing means, including a printed circuit board having a transformer mounted thereon, in said housing;

first push-on connector means adapted to mechanically and electrically engage said electrical phase busbar;

second push-on connector means adapted to mechanically and electrically engage said electrical neutral bar;

first and second terminals connected to said first and said second push-on connector means, respectively, and adapted to connect an electrical phase and an electrical neutral load conductor to said circuit breaker; and a neutral conductive strap and a phase conductive strap supported on said printed circuit board and passing through a window in said transformer and connected at one end, respectively, to said first and second terminals, said transformer being magnetically coupled to said conductive straps and responsive to currents flowing therein, said second push-on connector means being formed at the other end of said neutral conductive strap.

* * * * *